United States Patent [19]
Nielsen

[11] Patent Number: 5,589,068
[45] Date of Patent: *Dec. 31, 1996

[54] METHOD OF CONTROLLING WASTE WATER PURIFICATION PLANTS USING MULTIPLE CONTROL FUNCTIONS

[75] Inventor: Marinus K. Nielsen, Virum, Denmark

[73] Assignee: I. Krüger Systems A/S, Søborg, Denmark

[*] Notice: The term of this patent shall not extend beyond the expiration date of Pat. No. 5,547,578.

[21] Appl. No.: 211,333
[22] PCT Filed: Oct. 1, 1992
[86] PCT No.: PCT/DK92/00290
  § 371 Date: Mar. 22, 1994
  § 102(e) Date: Mar. 22, 1994
[87] PCT Pub. No.: WO93/07088
  PCT Pub. Date: Apr. 15, 1993

[30] Foreign Application Priority Data

Oct. 1, 1991 [DK] Denmark .................................. 1678/91

[51] Int. Cl.[6] ..................................................... C02F 3/00
[52] U.S. Cl. ........................... 210/614; 210/739; 210/96.1
[58] Field of Search ..................................... 210/614, 96.1, 210/739

[56] References Cited

FOREIGN PATENT DOCUMENTS 0446036  9/1991  European Pat. Off. .

OTHER PUBLICATIONS

M. Kümmel et al., "Computer Control of an Alternating Activated Sludge Process" in The International Symposium on Process Systems Engineering, Kyoto, Japan, Aug. 23–27, 1982.

Primary Examiner—Thomas G. Wyse
Attorney, Agent, or Firm—Watson Cole Stevens Davis, P.L.L.C.

[57] ABSTRACT

A method of automatically controlling a wastewater purification plant comprises the steps of measuring two or more of a number of parameters, determining a control parameter on the basis of the measurement results obtained and at least two selected control functions, selecting a control action on the basis of the determined control parameter and subsequently implementing the selected control action.

15 Claims, 4 Drawing Sheets

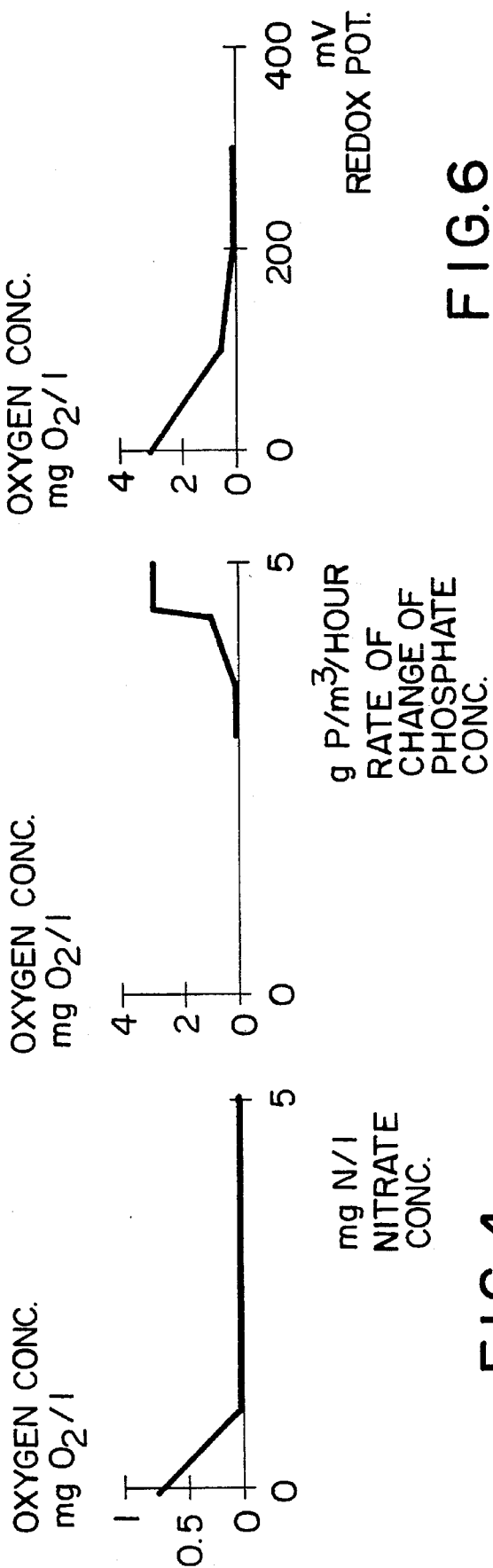

METHOD OF CONTROLLING WASTE WATER PURIFICATION PLANTS USING MULTIPLE CONTROL FUNCTIONS

BACKGROUND OF THE INVENTION

1. Field of the Invention

The present invention relates to a method of automatically controlling a waste water purification plant wherein one or more of a number of system parameters are measured, a control parameter on the basis of the measurement results obtained and a selected control function are determined, a control action on the basis of the determined control is selected parameter, and the selected control action is implemented.

2. The Prior Art

In a prior art method of the type mentioned above, control is effected of biological waste water plants, wherein it is desired to carry out a microbial removal of the nitrogen and phosphorous containing compounds as well as organic matter.

A variety of embodiments of such biological purification plants are known, but they generally have the common feature that they comprise a nitrification tank or zone operated in aerobic conditions, a denitrification tank or zone operated in anoxic conditions and a clarification tank in which a sedimentation of active sludge is carried out and from which tank part of the active sludge is generally recycled to the nitrification and/or denitrification tank.

The above-mentioned group of purification plant types comprises two main types, viz. plants wherein recycling of completely or partially treated waste water is effected and plants comprising two treatment tanks which are alternately operated in anoxic and aerobic conditions, and in which plants no recycling of completely or partially treated waste water is effected.

In the prior art method an initial measurement is carried out of a given parameter, such as the oxygen concentration and the ammonium concentration, in the aerobic tank. On the basis of the measurement result obtained the state of the aerobic tank is identified, and subsequently the identified plant state and a preselected control criterium, e.g., maintenance of the oxygen concentration in the aerobic tank at a desired level, form the basis of a selection of a control action, e.g., in the form of a change in the oxygen supply rate.

Identification of the plant state is effected by means of a mathematical model for the relevant purification process quantitatively describing the correlation between the various measurement parameters.

The mathematical model allows i.a. control carried out using a given control criterium related to a specific measurement parameter, to be carried out on the basis of a measurement of another parameter, e.g. the oxygen set point may be controlled on the basis of a measurement of the ammonium concentration.

In another prior art method of the type described above, control is effected on the basis of measurement results for one of two or more measurement parameters. Priorities are given to the individual measurement parameters on the basis of their information value, suitability and credibility, and in normal conditions control is effected on the basis of measurement results for the measurement parameter of first priority.

If, for a period of time, it is impossible to obtain measurement results for the measurement parameter of first priority, or in case the measurement results obtained are considered erroneous and therefore have to be rejected, control is instead effected on the basis of the measurement parameter of second priority etc. This is generally known as a priority sequence of control criteria.

In a third prior art control method, control is carried out using measurements for two or more parameters simultaneously. In this control method, the measurement result of one parameter, e.g., the ammonium concentration, is used to determine the desired value (the set point) of a second parameter, e.g., the oxygen concentration. The fixed set point of the second parameter is then compared to a measurement of said parameter carried out simultaneously with the measurement of the first parameter, and on the basis of the said comparison a control action is then selected for the change of the second parameter from the measured value to the set point value. Such control method is generally known as a cascade control.

"Computer Control of an Alternating Activated Sludge Process", Kummel M. and Nielsen M. K., published at The International Symposium on Process Systems Engineering, Kyoto, August 23–27, 1982, discloses a method of controlling a biological purification plant comprising two treatment tanks which are alternately operated in anoxic and aerobic conditions, and wherein the flow pattern is changed accordingly and so that the untreated waste water is supplied to the anoxic tank, from which it is carried to the aerobic tank and therefrom further on in the plant to a clarification tank in which a sedimentation of active sludge is carried out, which sludge is subsequently recycled in the plant for introduction into the anoxic tank, and from which clarification tank the effluent is discharged.

The control is effected by means of a computer collecting the measurement results, analyzing the results on the basis of a mathematical model and implementing new control strategies.

In the prior art method, measurements of oxygen, ammonium and nitrate are carried out using suitable sensors, the control parameters used being the oxygen supply rate and the nitrification and denitrification period ratio.

In the prior art method, the ammonium and nitrate concentration methods are used continuously to determine the corresponding optimum oxygen concentration (the set point) during the nitrification and denitrification processes, respectively.

Furthermore the nitrification and denitrification period ratio is controlled relative to the ammonium content of the untreated waste water, i.e., such that the nitrification period is prolonged when the ammonium load is high and shortened when the ammonium load is low, and vice versa for the denitrification period.

EP-A-0,446,036 discloses an apparatus for controlling a system, e.g. a waste water purification plant, the apparatus:comprising 1) a number of measuring units, 2) means for analysing measurement data in order to select a characteristic data set, 3) means for analysing the characteristic data set in order to identify a possible operation problem, 4) means for analysing the operation problem in order to find a strategy for resolution of the problem, and 5) means for controlling the system on the basis of the strategy.

SUMMARY OF THE INVENTION

Use of the means for analysing the operation problem includes a strategy determination mechanism, wherein measurement results for a number of parameters are used as input data to a neural network, and the information contained in the output data from the neural network is used as a basis for determining a set of setpoints for the control parameters.

It is the object of the present invention to provided method of the type described which provides a more efficient, and accurate control than the prior art methods.

The method according to the invention is characterized in that the control parameter is determined on the basis of the measurement results for at least two parameters and the control functions associated with said parameters.

The invention is based on the discovery that some of the parameters measured during the control of a waste water purification plant provide information about the same physical conditions, and that consequently such parameters may be used to obtain a more accurate, quick and reliable identification of the state of the plant and determination of the control parameter, thereby resulting in a more efficient control of the plant.

Furthermore, the use of the method according to the invention allows an improved utilization of the capacity of the purification plant.

In addition it is possible to identify variations in the amount and concentration of polluting substances in the waste water supplied to the plant more quickly than with the prior art methods, and consequently a more efficient control is obtained.

As used herein the term "control function" means the function according to which a given control parameter according to a mathematical model of the deterministic/stocastic type is determined relative to a given measurement parameter or a parameter derived therefrom, i.e. the control function defines the correlation between the control parameter and the measurement parameter or the parameter derived therefrom.

The control functions used according to the invention are preferable determined on the basis of past data and experience from earlier operations.

The control functions used are typically discontinuous functions which are a combination of various continuous functions.

An example of a control parameter in a control function is the desired value (the set point) of the oxygen concentration in a nitrification tank. Examples of measurement parameters associated with this control parameter comprise the nitrate concentration, the redox potential and the phosphate concentration.

The fixed set point of the oxygen concentration in the nitrification tank forms, e.g. in combination with a measurement value for the same oxygen concentration, the basis of the selection of a suitable control action in the form of an increase or a reduction in the oxygen supply to the nitrification tank.

Another example of a control parameter of a control function is the actual ammonium concentration in a denitrification tank. Examples of measurement parameters associated with this control parameter comprise the ammonium concentration, the oxygen concentration and the oxygen supply.

The fixed value for the ammonium concentration may e.g. form the basis of determining whether the operation conditions should be shifted between the nitrification and denitrification tanks during the control of a purification plant of the type described above in connection with the disclosure of the article "Computer Control of an Alternating Activated Sludge Process".

A preferred embodiment of the invention is characterized in that the control parameter is determined on the basis of a weighted combination of control functions, the control functions being weighted relative to their suitability in connection with the control action in question.

The use of this embodiment of the invention allows the control functions used in the determination of the control parameter to be weighted differently depending on the magnitude of the parameter.

The control parameter may, e.g., be determined by use of one of the following two formulas:

$$CP = \frac{w_1 \cdot cp_1 + w_2 \cdot cp_2 + w_3 \cdot cp_3 + \ldots + w_m \cdot cp_m}{w_1 + w_2 + w_3 \ldots + w_m} \quad (1)$$

wherein CP is the determined control parameter, w are weights, $c_{pi}$ are the control parameter determined with the individual control functions and m is a positive integer above 1, $$CP = \frac{w_1 \cdot cp_1^{n_1+1} + w_2 \cdot cp_2^{n_2+1} + w_3 \cdot cp_3^{n_3+1} \ldots + w_m \cdot cp_m^{n_m+1}}{w_1 \cdot cp_1^{n_1} + w_2 cp_2^{n_2} + w_3 \cdot cp_3^{n_3} + \ldots + w_m \cdot cp_m^{n_m}} \quad (2)$$

wherein CP, $w_i$, $c_{pi}$ and m have the meaning defined above, and wherein $n_i$ are real numbers.

Due to the use of the $n_i$ values, formula (2) allows different weighting of the individual control functions depending on the magnitude of the control parameter.

The determination of the control parameter using weights for the individual control functions may further be carried out by using a combination of different continuous functions, such as exponential, logarithmic and potency functions, i.e., using conventional statistic and stocastic models.

The determination of the control parameter and the subsequent selection of the control action are preferably carried out using a mathematical model for the purification plant which defines the correlation between measurement parameters, derived measurement parameters and control parameters and which can describe the state of the purification plant at the relevant point of time. Alternatively, the control action may be determined on the basis of a predetermined set of rules.

Another preferred embodiment of the invention is characterized in that the quality of the measurement results is evaluated and that the control parameter is determined on the basis of the evaluated measurement results.

The evaluation of the quality of the measurement results is preferably carried out using the method described in DK patent application No. 1677/91 having the title "Method of controlling waste water purification plants using quality evaluation of measurement data", said application being filed on the same day as the present application.

Reference is made to the application for a more detailed description of the way in which the evaluation of the quality of the measurement results is carried out in the above-mentioned preferred embodiment of the invention.

The quality evaluation of the measurement results is preferably carried out on the basis of a comparison of the measurement value for at least one parameter with an expected dynamic value interval calculated continuously on the basis of the mathematical model and a simultaneous and/or previous measurement of one or several other parameters and/or a previous measurement of the same parameter.

The expected dynamic value interval is preferably determined by calculation of an expected dynamic value and maximum variations therefrom.

More preferably, the quality evaluation of the measurement results is carried out by evaluating the credibility of the measurement value on the basis of the comparison of the measurement value with the expected dynamic value interval by the allocation of a credibility factor which, in combination with the measurement value, is used in the subsequent determination of the control parameter.

Prior to the determination of the control parameter, the measurement results may possibly be corrected with a value corresponding to the magnitude of the identifiable measurement interference, if any.

As used herein the term "identifiable measurement interference" means measurement interference caused by influences imposed on the purification plant in connection with the control of same.

The quantification of the identifiable measurement interference is preferably carried out on the basis of the mathematical model and past data of response courses for control modifications of the same type carried out previously.

In the above preferred embodiment of the invention, the control parameter is determined at any time on the basis of the most credible measurement results of those available and by weighting of same according to their credibility, thereby obtaining an optimum control compared to the collected material of measurement results, and which control is far more efficient than the control obtained with the prior art methods.

In this preferred embodiment of the invention, the control parameter is determined on the basis of the collected measurement values for two or more parameters and the control functions and credibility factors associated therewith.

In this case the control parameter may e.g. be determined by using one of the following two formulas:

$$CP = \frac{w_1 \cdot cf_1 \cdot cp_1 + w_2 \cdot cf_2 \cdot cp_2 + w_3 \cdot cf_3 \cdot cp_3 + \ldots + w_m \cdot cf_m \cdot cp_m}{w_1 \cdot cf_1 + w_2 \cdot cf_2 + w_3 \cdot cf_3 + \ldots + w_m \cdot cf_m}$$

wherein CP, $w_i$, $cp_i$ and m have the meaning defined above, and wherein $cf_i$ is a credibility factor, $$CP = \frac{w_1 \cdot cf_1 \cdot cp_1^{n_1+1} + w_2 \cdot cf_2 \cdot cp_2^{n_2+1} + w_3 \cdot cf_3 \cdot cp_3^{n_3+1} + \ldots + w_m \cdot cf_m \cdot cp_m^{n_m+1}}{w_1 \cdot cf_1 \cdot cf_1^{n_1} + w_2 \cdot cf_2 \cdot cp_2^{n_2} + w_3 \cdot cf_3 \cdot cp_3^{n_3} + \ldots + w_m \cdot cf_m \cdot cp_m^{n_m}}$$

wherein CP, $w_i$, $cp_i$, $cf_i$, $n_i$ and m have the meaning defined above.

The method according to the invention is preferably carried out using an integral control and computer system (control apparatus) collecting and storing measurement results and control signals, processing the collected data using a mathematical model and implementing new control actions.

The waste water purification plant controlled according to the method of the invention may be a biological waste water purification plant wherein the purification is carried out by means of microorganisms.

BRIEF DESCRIPTION OF THE DRAWINGS

The invention will now be described in further details with reference to the accompanying drawings, wherein.

DETAILED DESCRIPTION OF THE PREFERRED EMBODIMENT

Figure 1:
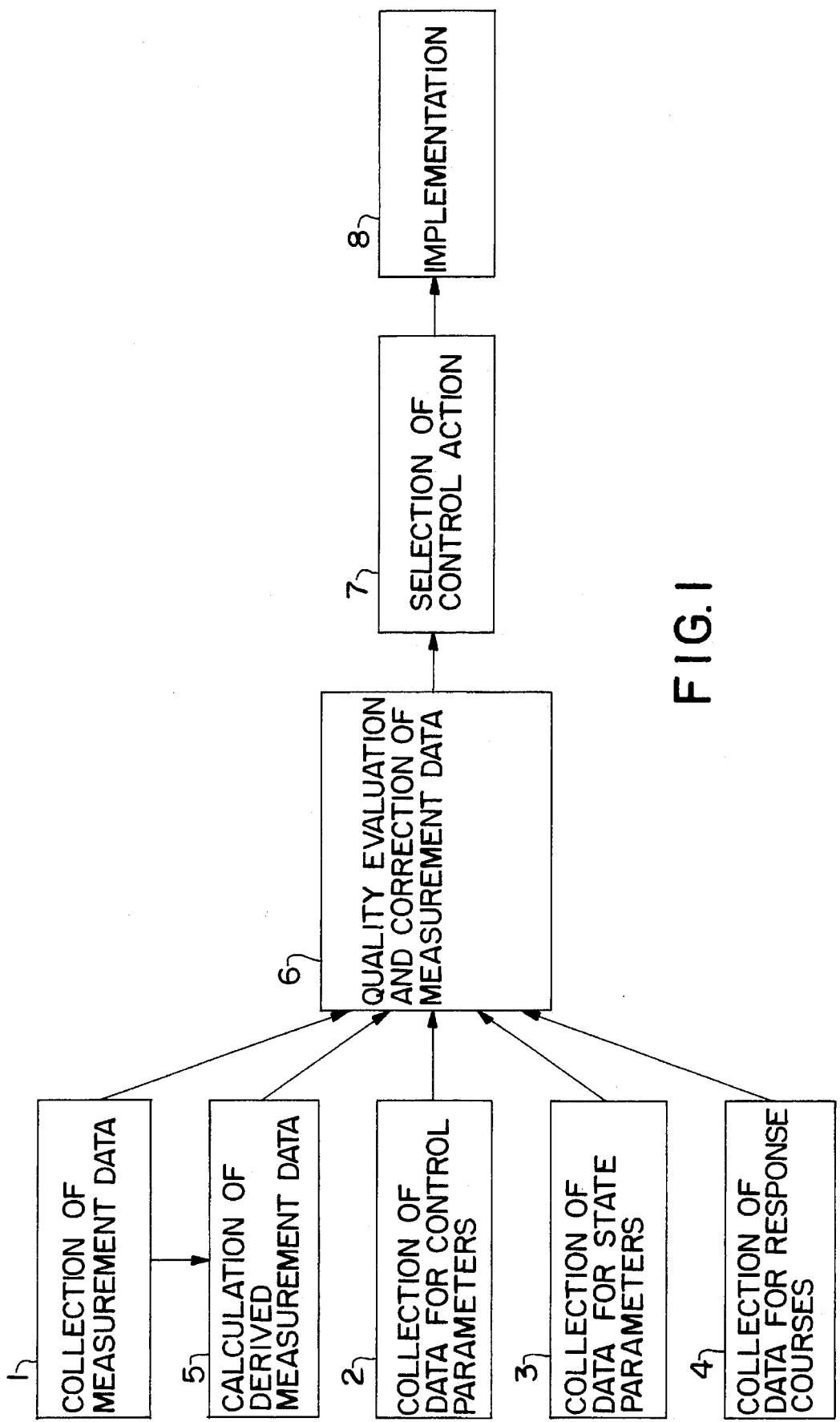
FIG. 1 is a block diagram of general action steps in controlling a waste water purification plant using a preferred embodiment of the method of the invention.

The action steps shown in FIG. 1 will now be explained in further details.

By using various measurement apparatuses, measurements of a number of parameters are carried out sequentially at different places in the waste water purification plant, and the measurement data thus obtained are collected (step 1) in the data base of a control apparatus. Examples of such measurement parameters comprise the concentration of ammonium, nitrate, oxygen, phosphate, cell dry matter and biomass in the untreated waste water, at various places in the purification plant and in the effluent, the amount of supplied untreated waste water and the amount of the oxygen supplied to the plant.

Furthermore sequential data are collected in the data base of the control apparatus for a variety of different control parameters (step 2), sequential data for a number of parameters (step 3) describing the state of the purification plant, such as time of the day and flow pattern, and data for the response course of the purification plant (step 4) on control actions previously made.

On the basis of the collected measurement data, derived measurement data are computed in the control apparatus (step 5), such as the rate of change of the oxygen concentration, the oxygen consumption rate and the nitrification and denitrification rate.

On the basis of the data collected during steps 1–5, a quality evaluation and correction of the measurement data collected in step 1 is carried out in step 6.

The set of quality evaluated and corrected measurement data obtained in step 6 forms the basis of the determination of the control parameter and a selection of the final control action (step 7).

This step may be carried out using a mathematical model defining the correlation between the measurement parameters, the derived measurement parameters and the control parameters and describing the state of the purification plant at the relevant point of time. Alternatively the control action may be determined on the basis of a predetermined set of rules.

After the final control action has been selected, it is implemented (step 8). The control apparatus effects the implementation by modifications of the setting of the control apparatus associated with the individual control parameters.

Figure 2:
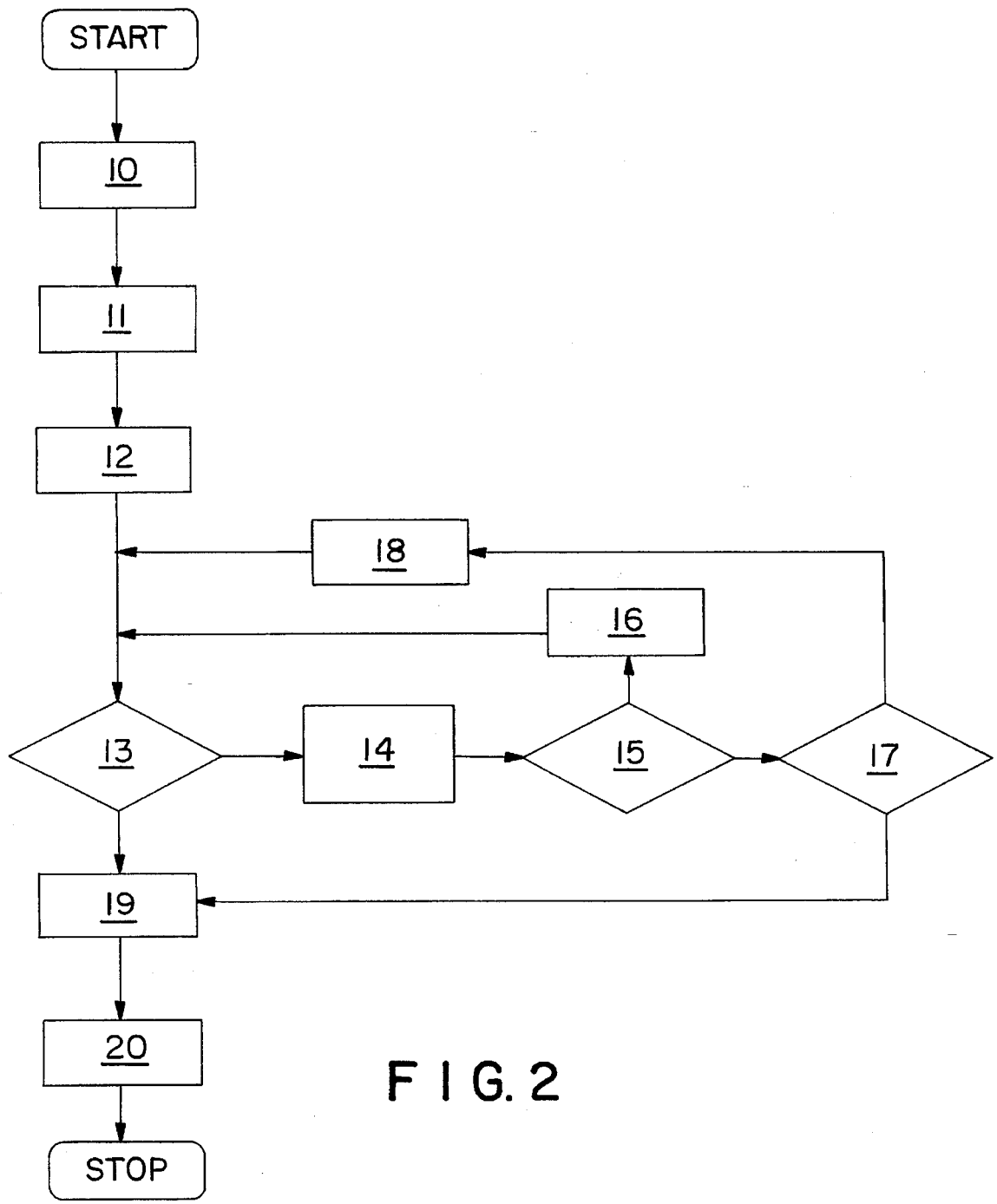
FIG. 2 is a flow diagram of action steps in the quality evaluation and correction of a measurement value in a preferred embodiment of the method according to the invention, FIG. 3. illustrates an actual example of a control function for an anoxic treatment tank in a given biological waste water purification plant, and the Figure is a diagrammatical view of the correlation between the ammonium concentration (the control parameter) and the oxygen consumption rate (the measurement parameter), FIGS. 4–6. illustrate actual examples of control functions for an aerobic treatment tank in a given biological waste water purification plant, and the three Figures are diagrammatical views of the correlation between the control parameter (the oxygen concentration) and three respective measurement parameters.

With reference to FIG. 2 it will now be explained in further details how the above-mentioned quality evaluation and correction (step 6) is carried out.

A given measurement value is initially subjected to a primary evaluation (step 10) comprising investigating whether the measurement value is comprised within a value interval having fixed and relatively wide limits corresponding to the maximum and minimum, respectively, values of the relevant measurement parameter appearing in ordinary operation conditions.

Furthermore, the primary evaluation comprises investigating whether the change of the measurement value as compared to the latest measurement carried out is comprised within a value change interval set so as also to have fixed and relatively wide limit values corresponding to the maximum values of the relevant measurement parameter appearing in ordinary operation conditions.

If the measurement value is not comprised within the above value interval, or if the change of the measurement value is not comprised within the above value change interval, the measurement value is rejected as erroneous.

Thus, the primary evaluation serves to discard the evidently erroneous measurements.

The state of the waste water purification plant at the time of the measurement is then identified (step 11), cf. step 3 described above.

In steps 12 and 13 the measurement value is verified, i.e. it is evaluated whether the value is correct or not.

The verification is effected by determining (step 13) whether the measurement value is comprised within a value interval determined on the basis of an expected value and maximum deviations therefrom, which may be computed (step 12) on the basis of the data collected in steps 1–5 and the mathematical model quantitatively describing the correlation between different parameters.

An example of such calculation of the expected value and maximum deviations is that the ammonium concentration in a given treatment tank is calculated on the basis of measurements of the amount of waste water supplied to the plant and the time of the day, providing indirect information about the ammonium concentration of the supplied waste water, and/or the past course for the ammonium concentration in the treatment tank, and/or the past course for the nitrate concentration in the treatment tank, and/or the oxygen concentration in the treatment tank, and the amount of oxygen supplied thereto, together providing information about the oxygen consumption rate.

When using several methods to calculate the expected value and maximum deviations therefrom, the methods are weighted according to their credibility.

If the measurement value is not comprised within the calculated value interval, the deviation of the measurement value from the expected value is calculated and stored (step 14).

Subsequently, it is investigated whether the measurement value includes identifiable measurement interference (step 15). Such identifiable measurement interference results from modifications made in the state of the purification plant in order to control said plant, such as modifications in the flow pattern of the purification plant by control of the pump operation and change in the oxygen supply rate to a treatment tank by control of the supply pump.

Such control modifications give rise to a relatively brief change of the measured parameter, which change of measurement parameter is not symptomatic of the general state dynamics of the plant.

Consequently, such brief change of the measurement parameter is neglected by correcting the measurement value with a value corresponding to the interference (step 16). The quantification of the interference is carried out on the basis of the mathematical model and past data of the response courses for modifications of the same type previously made, which data are collected and stored in the memory of the control apparatus.

After the measurement value has been corrected, it is investigated again whether the corrected measurement value is comprised within the value interval computed in step 12.

If it is found in step 16 that the measurement value does not include any identifiable interference, it is investiagted whether the value interval calculation made in step 12 is incorrect (step 17), which e.g. may be the case if sudden changes in the load of the purification plant occur, i.e. changes in the amount and/or concentration of the waste water supplied to the plant. Thus, step 17 includes measurement values for further measurement parameters compared to the measurement parameters forming the basis of the value interval calculation made in step 12.

If it is found in step 17 that the state of the purification plant has changed so that the value interval calculation made in step 12 is incorrect, a revised value interval (step 18) is computed on the basis of the measurement parameters used in steps 12 and 17, which revised value interval is used for comparison with the measurement value approved in step 10 and possibly corrected in step 15.

As explained above, initially only measurement results for a limited set of measurement parameters are preferably used in the value interval calculation made in step 12, as measurement results for a further set of measurement results are only included, if it is found that the measurement value is beyond the value interval initially computed. Such division of the verification procedure is preferred in order to limit the calculation work associated therewith and hence the necessary computer capacity.

Alternatively, all the measurement parameters used in steps 12 and 17 may be included in the value interval calculation initially made, corresponding to the cancellation of steps 17 and 18 from the flow diagram shown in FIG. 2.

After the verification and a correction, if any, the measurement value is evaluated as to credibility (step 19), irrespective of whether said value is comprised within the value interval calculated in steps 12 or 18, or not.

Of course measurement values beyond the above mentioned value interval have a low credibility and are generally not used in the subsequent selection of the final control action, except in particular situations where the measurement results obtained are few or of a poor quality.

The credibility evaluation is effected by comparing said measurement value with the value interval computed in step 12 or the revised value interval calculated in step 18, and on the basis of the result of this comparison by subsequently allotting the measurement value a credibility factor which is stored in the data base of the computer system (step 20), and using said factor in combination with the possibly corrected measurement value for the subsequent selection of the final control action.

The invention will now be explained in further detail with reference to the following example.

EXAMPLE

It is desired to control a biological waste water purification plant comprising two treatment tanks which are alternately operated in anoxic and aerobic conditions, and wherein the flow pattern is changed accordingly and so that the untreated waste water is supplied to the anoxic tank (denitrification tank), from which it is carried to the aerobic tank (nitrification tank) and therefrom further on in the plant to a clarification tank, in which a sedimentation of active sludge is carried out, the sludge subsequently being recycled in the plant for introduction into the anoxic tank and from which clarification tank the effluent is dicharged.

The general control strategy comprises two control criteria, viz. 1) shifting the operation state between the two treatment tanks, i.e., a change in the set point of the oxygen concentration in the two tanks and a change in the flow pattern of the plant, if both the nitrate concentration in the denitrification tank and the ammonium concentration in the nitrification tank are less than or equal to predetermined respective minimum limit values, and 2) controlling the oxygen concentration during the course of the nitrification and denitrification phase in the two respective tanks in relation to the desired oxygen concentration (set point) determined on the basis of measurements of other parameters.

Control according to control criterium 1) is effected by use of, e.g., the ammonium concentration in the nitrification tank as control parameter, and the measurement parameters associated therewith are the oxygen concentration, the oxygen supply and the ammonium concentration in the same tank.

Figure 3:
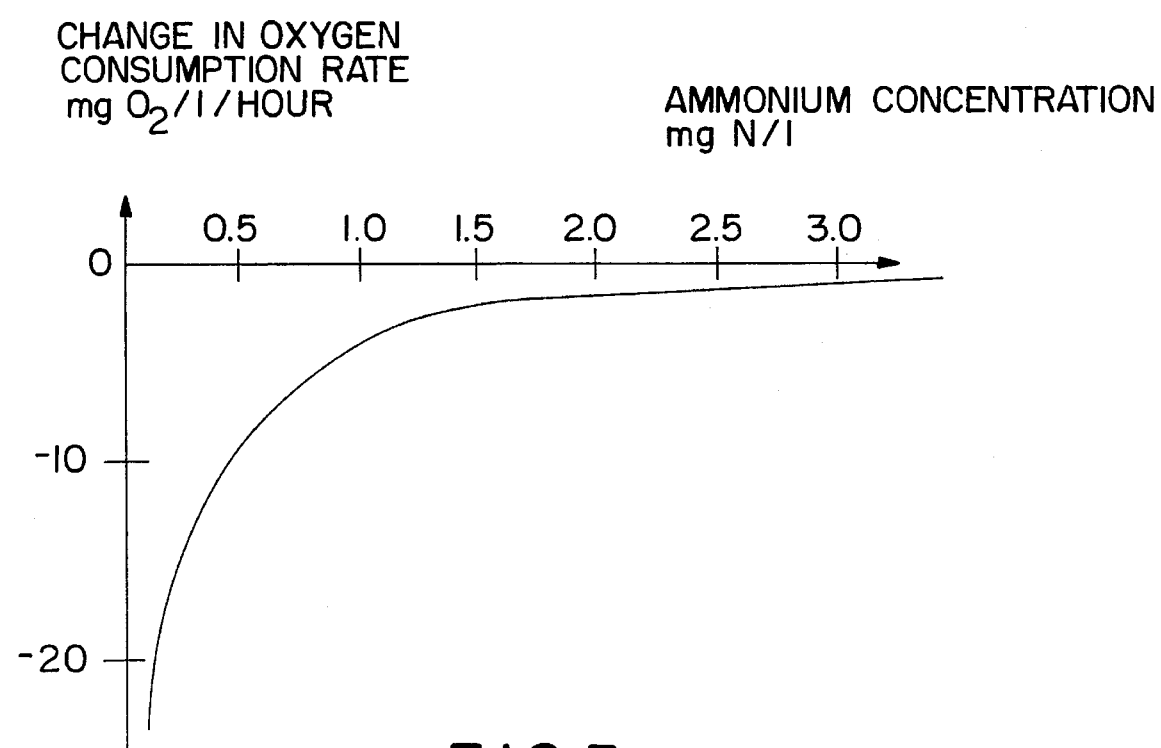

On the basis of the measurement values for the oxygen concentration of and the oxygen supply to the aerobic tank, it is possible to compute the oxygen consumption rate in the tank. The change in the oxygen consumption rate is coupled to the ammonium concentration, and the correlation between the two noted parameters, i.e., the control function used is determined on the basis of past data and experience from earlier operations and calculations using a mathematical model. The control function is shown in FIG. 3.

Control according to control criterium 2) is effected by use of e.g. the set point of the oxygen concentration in the denitrification tank as control parameter, and the measurement parameters associated therewith comprise the nitrate concentration, the phosphate concentration and the redox potential in the same tank.

The control functions used for the three measurement parameters are determined on the basis of past data and experience from earlier operations, and the functions will appear from FIGS. 4–6 showing the desired oxygen concentration measured in mg $O_2$ per liter as a function of the nitrate concentration, the rate of change of the phosphate concentration (calculated on the basis of the phosphate measurements) and the redox potential, respectively.

Control according to control criterium 1) results in a measurement of an ammonium concentration in the nitrification tank of 1.5 mg $NH_4$—N per liter, and the measured values for the oxygen concentration and the oxygen supply in the same tank are calculated to correspond to a change in the oxygen consumption rate of −0.5 mg $O_2$ per liter per hour. On the basis of the control function shown in FIG. 3 it is found that the measured oxygen consumption rate corresponds to an ammonium concentration of 0.9 mg $NH_4$—N per liter.

The control functions for the measurement parameter of ammonium concentration and the derived measurement parameter of oxygen consumption rate are allotted the weights 0.8 and 0.2, respectively.

The control parameter, i.e. the ammonium concentration (AC), is then determined using the above formula (1):

$$CP_{AC} = \frac{0.8 \cdot 1.5 \text{ mg } NH_4 - N/l + 0.2 \cdot 0.9 \text{ mg } NH_4 - N/l}{0.8 + 0.2} = 1.38 \text{ mg } NH_4 - N/l$$

As the determined value for the control parameter is greater than the minimum limit value causing a shift in the operation conditions between the two treatment tanks, no such shift is effected.

Control according to control criterium 2) results in a measurement of a nitrate concentration in the denitrification tank of 0.5 mg $NO_3$—N. per liter and a redox potential of 90 mV, and on the basis of measurements of the phosphate concentration in the same tank the rate of change of the phosphate concentration is calculated to amount to 2 g $PO_4$—P per $m^3$ per hour. On the basis of the control functions shown in FIGS. 4–6, three different values for the set point of the oxygen concentration are found, viz. 0.2 mg $O_2$ per liter, 0 mg $O_2$ per liter and 0.7 mg $O_2$ per liter, respectively.

The control functions for the measurement parameter of nitrate concentration, the derived measurement parameter of rate of change of the phosphate concentration and the measurement parameter of redox potential are allotted the weights 7, 5 and 3, respectively.

The control parameter, i.e. the set point of the oxygen concentration (SOC), is then determined using the above formula (1):

$$CP_{SOC} = \frac{0.2 \text{ mg } O_2/l \cdot 7 + 0 \text{ mg } O_2/l \cdot 5 + 0.7 \text{ mg } O_2/l \cdot 3}{(7 + 5 + 3)} = 0.23 \text{ mg } O_2/\text{liter}$$

On the basis of the determined control parameter, a control action can now be selected, causing the oxygen concentration in the denitrification tank to be raised from the previous 0 mg $O_2$ per liter to 0.23 mg $O_2$ per liter. This increase in the oxygen concentration expresses the fact that the information contained in the measurement values used for the three measurement parameters indicates that the nitrate concentration is less than the minimum limit value causing a shift in the operation state to be effected, and that the set point of the oxygen concentration therefore may be slightly raised to allow reaction of ammonium during the period up to the point of time where a shift in the operation state between the tanks is carried out. Consequently, an improved utilization of the volume capacity of the plant and a more efficient purification of the waste water are obtained.

Furthermore, the above control procedure results in a very quick and reliable identification of the state of the denitrification tank and hence a more efficient control of the same.

I claim:

1. A method of automatically controlling a waste water purification plant comprising the steps of measuring at least one system parameter, determining a control parameter on the basis of the measurement results obtained and a selected control function, selecting a control action on the basis of the determined control parameter, and subsequently implementing the selected control action, wherein the control parameter is determined on the basis of the measurement results for at least two parameters and the control functions associated with said parameters.

2. A method according to claim 1, wherein the control parameter is determined on the basis of a weighted combination of the control functions, the control functions being weighted in relation to their suitability in connection with the control action in question.

3. A method according to claim 2, wherein the control functions used in determining the control parameter are weighted differently depending on the magnitude of the control parameter.

4. A method according to claim 1, wherein the determination of the control parameter and the subsequent selection of the control action are carried out using a mathematical model for the purification plant.

5. A method according to claim 4, wherein the quality of the measurement results is evaluated and that the determination of the control parameter is effected on the basis of the said evaluated measurement results.

6. A method according to claim 5, wherein the quality is evaluated on the basis of a comparison of the measurement value for at least one parameter with an excepted dynamic value interval calculated continuously on the basis of the mathematical model and a simultaneous measurement of at least one other parameter.

7. A method according to claim 6, wherein the expected dynamic value interval is determined by calculation of an expected dynamic value and maximum deviations therefrom.

8. A method according to claim 6, wherein the credibility of the measurement value is evaluated on the basis of the comparison of the measurement value with the expected dynamic value interval by the allocation of a credibility factor which, in combination with the measurement value, is used in the subsequent determination of the control parameter.

9. A method according claim 1, wherein prior to the selection of the control action the measurement results are corrected with a value corresponding to the size of the identifiable measurement interference.

10. A method according to claim 9, wherein the quantification of the identifiable measurement interference is effected on the basis of the mathematical model and past data of response courses for control modifications of the same type previously made.

11. A method according to claim 1, wherein using an integral control and computer system (control apparatus) collecting and storing measurement results and control signals, processing the collected data using the mathematical model and implementing new control actions.

12. A method according to claim 1, wherein the controlled waste water purification plant is a biological waste water purification plant in which the purification is carried out by means of microorganisms.

13. A method according to claim 5, wherein the quality is evaluated on the basis of a comparison of the measurement value for at least one parameter with an expected dynamic value interval calculated continuously on the basis of the mathematical model and a prior measurement of at least one other parameter.

14. A method according to claim 5, wherein the quality is evaluated on the basis of a comparison of the measurement value for at least one parameter with an expected dynamic value interval calculated continuously on the basis of the mathematical model and both a simultaneous and a prior measurement of at least one other parameter.

15. A method according to claim 5, wherein the quality is evaluated on the basis of a comparison of the measurement value for at least one parameter with an expected dynamic value interval calculated continuously on the basis of the mathematical model and prior measurement of the same parameter.

* * * * *